United States Patent
Lai

(10) Patent No.: US 8,348,574 B2
(45) Date of Patent: Jan. 8, 2013

(54) SELF-DRILLING SCREW AND FABRICATING METHOD FOR THE SAME

(76) Inventor: Tsung-Cheng Lai, Luchu Hsiang (TW)

( * ) Notice: Subject to any disclaimer, the term of this patent is extended or adjusted under 35 U.S.C. 154(b) by 360 days.

(21) Appl. No.: 12/778,095

(22) Filed: May 11, 2010

(65) Prior Publication Data

US 2011/0280684 A1     Nov. 17, 2011

(51) Int. Cl.
*F16B 25/10*     (2006.01)
(52) U.S. Cl. .................... 411/387.7; 411/387.1
(58) Field of Classification Search ............... 411/387.1, 411/387.2, 387.5, 387.6, 387.7, 387.8
See application file for complete search history.

(56) References Cited

U.S. PATENT DOCUMENTS 4,192,217 A * 3/1980 Schwartzman ............ 411/387.8
4,233,880 A * 11/1980 Bjorklund et al. ........ 411/387.6
4,781,506 A * 11/1988 Roberts et al. ............ 411/387.8
6,402,448 B1 * 6/2002 Dicke ....................... 411/387.5

* cited by examiner

*Primary Examiner* — Gary Estremsky
(74) *Attorney, Agent, or Firm* — Hershkovitz & Associates, LLC; Abraham Hershkovitz

(57) ABSTRACT

A fabricating method for the self-drilling screw has acts of forming a main section and a secondary section by punching, forming a flat drilling blade with a tapered end at a bottom end of the small diameter portion by punching, and forming a thread portion on an outer surface of the main section and a chip removal thread portion with a spiral chip removal groove on an outer surface of the secondary section by rolling. The self-drilling screw utilizes the flat drilling blade with the tapered end and the chip removal section having chip removal function to reduce the size of the drilling blade. Therefore, the self-drilling screw reduces the size of the punching die, lowers the punching force, lowers both the load of the punching die and the load of the punching machine, and lowers both the die cost and the manufacturing cost.

3 Claims, 6 Drawing Sheets

SELF-DRILLING SCREW AND FABRICATING METHOD FOR THE SAME

BACKGROUND OF THE INVENTION

1. Field of the Invention

The present invention relates to a self-drilling screw, especially to a self-drilling screw which can lower die cost.

2. Description of the Prior Arts

With reference to FIG. 6, a conventional self-drilling screw has a screw head 51 and a rod-shaped main body 50. The main body 50 has a thread portion 52 and a drilling blade 53. The thread portion 52 is formed around the main body 50. The drilling blade 53 is formed on an end of the main body 50. By the design of the drilling blade 53 of the conventional self-drilling screw, the conventional self-drilling screw has drilling, tapping and fastening functions.

With reference to FIGS. 7A to 7C, a conventional fabricating method for the conventional self-drilling screw has following steps: forming a screw blank B which has a screw head 51 and a rod B1 by punching, forming a rod-shaped drilling blade 53 at an end of the rod B1 of the screw blank B by punching, and forming a thread portion 52 on an outer surface of the rod B1 by rolling. The step of forming the thread portion 52 removes burrs near the drilling blade 53 at the same time.

Regarding the punching in the conventional fabricating method of conventional self-drilling screws, current dies and machines can be used for fabricating self-drilling screws with stable quality. However, because the size of self-drilling screws is larger or the material of self-drilling screws is harder, self-drilling screws having international standard number larger than No. 5, having diameter larger than 6.5 mm, or made from stainless steel are difficult to fabricate by punching. The size of the punching die is larger while the length or width of the drilling blade is larger, which increases the cost of the punching die. Besides, the punching machine must output larger punching force while the size of the punching die is larger or the blank is more difficult to form, which increases both the load of the punching die and the load of the punching machine. Moreover, larger punching force damages the punching die easier, which also increases manufacturing cost.

Furthermore, the step of forming the drilling blade 53 forms a chip removal groove at the same time. Because of the limitation of the punching, the chip removal groove is not spiral and is almost parallel to an axial direction of the self-drilling screw, which is bad for the removal of the chips.

To overcome the shortcomings, the present invention provides a self-drilling screw to mitigate or obviate the aforementioned problems.

SUMMARY OF THE INVENTION

The main objective of the present invention is to provide a self-drilling screw that reduces the size of the punching die, lowers the punching force, lowers both the load of the punching die and the load of the punching machine, lowers both the die cost and the manufacturing cost, and is beneficial for the removal of chips.

The self-drilling screw comprises a screw head, a body, a chip removal section and a drilling blade. The body is formed on a bottom end of the screw head and has a screw rod and a thread portion. The screw rod protrudes longitudinally from the bottom end of the screw head. The thread portion is formed on an outer surface of the screw rod. The chip removal section is formed on a bottom end of the body and has a chip removal rod, a chip removal thread portion and a spiral chip removal groove. The chip removal rod protrudes longitudinally from the bottom end of the screw rod wherein the chip removal rod is thinner than the screw rod. The chip removal thread portion is formed on an outer surface of the chip removal rod wherein the outer diameter of the chip removal thread portion is close to the diameter of the screw rod. The spiral chip removal groove is formed in the chip removal thread portion. The drilling blade is flat with a tapered end and formed on a bottom end of the chip removal section wherein the width of the drilling blade is smaller than the outer diameter of the thread portion and is slightly bigger than the diameter of the screw rod.

Another objective of the present invention is to provide a fabricating method for a self-drilling screw that reduces the size of the punching die, lowers the punching force, lowers both the load of the punching die and the load of the punching machine, lowers both the die cost and the manufacturing cost, and is beneficial for the removal of chips.

The fabricating method for a self-drilling screw comprising acts of:

forming a rod blank with a main section, a secondary section and a screw head by punching, wherein the main section is formed between the secondary section and the screw head and the secondary section is thinner than the main section;

forming a flat drilling blade with a tapered end at a bottom end of the secondary section by punching, wherein the width of the drilling blade is slightly bigger than the diameter of the main section; and forming a thread portion on an outer surface of the main section and a chip removal thread portion on an outer surface of the secondary section by rolling.

The present invention utilizes the flat drilling blade with the tapered end and the chip removal section having chip removal function to reduce the size of the drilling blade. Therefore, the present invention reduces the size of the punching die, lowers the punching force, lowers both the load of the punching die and the load of the punching machine, improves the quality of the self-drilling screw, and lowers both the die cost and the manufacturing cost. Besides, the present invention is especially suitable for fabricating the self-drilling screw of big size and made from material hard to manufacture like stainless steel.

Furthermore, because the chip removal groove is spiral, it is beneficial for the removal of chips while the self-drilling screw is drilled into a workpiece.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
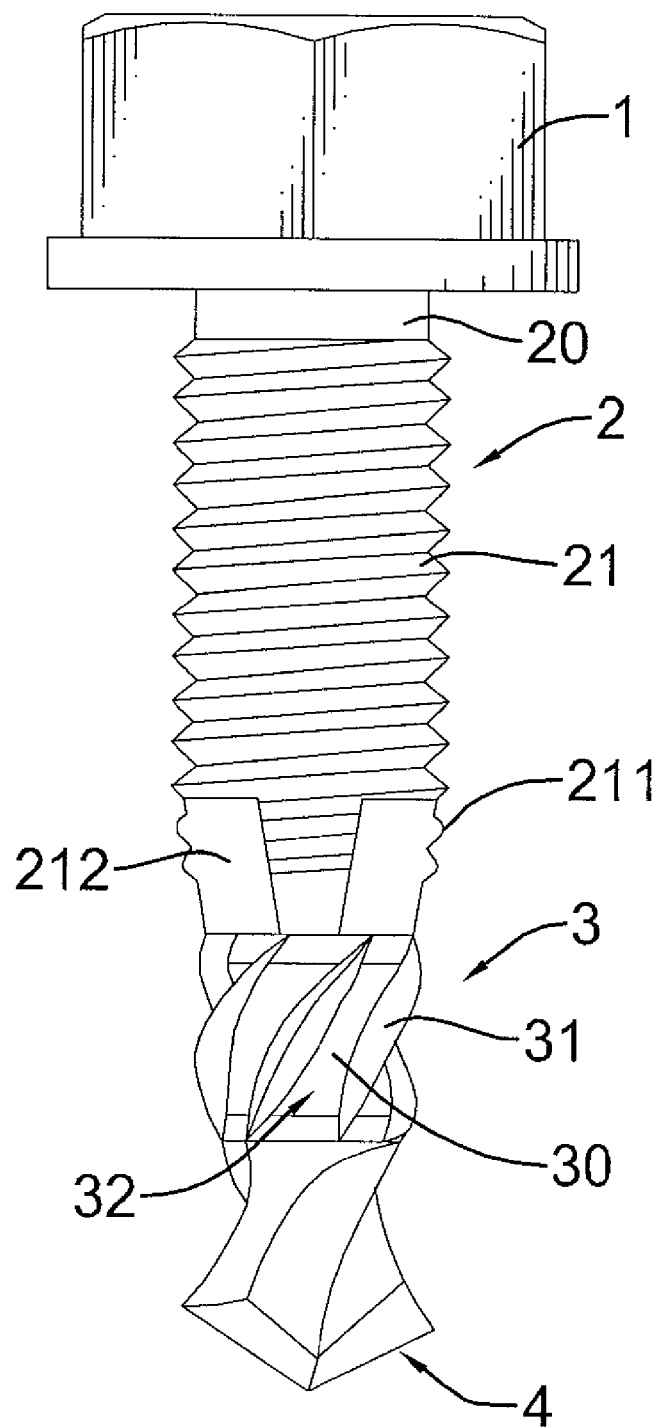
FIG. 1 is a side view of a first embodiment of a self-drilling screw in accordance with the present invention.
Figure 2:
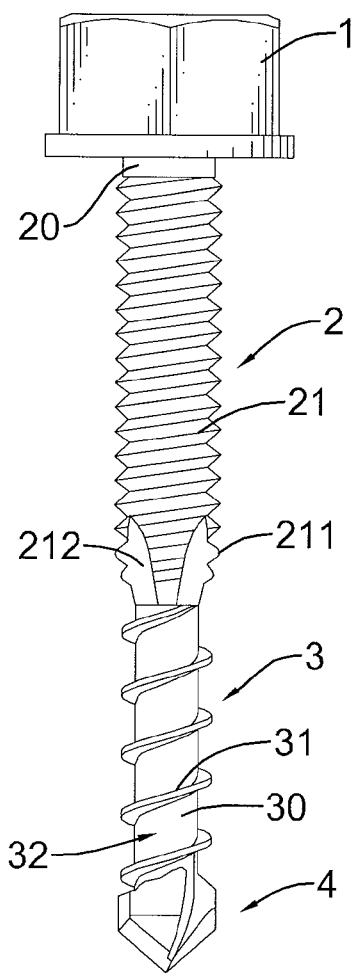
FIG. 2 is a side view of a second embodiment of a self-drilling screw in accordance with the present invention.

With reference to FIGS. 1 and 2, a self-drilling screw in accordance with the present invention comprises a screw head 1, a body 2, a chip removal section 3 and a drilling blade 4.

The screw head 1 may be a hemisphere, hexagon or flat-topped cone. When the screw head 1 is hexagonal or a flat-topped cone, a top surface of the screw head 1 may have a hexagon hole or a cross slot for a tool to engage.

The body 2 is formed on a bottom end of the screw head 1. The body 2 has a screw rod 20 and a thread portion 21. The screw rod 20 protrudes longitudinally from the bottom end of the screw head 1. The thread portion 21 is formed on an outer surface of the screw rod 20.

The chip removal section 3 is formed on a bottom end of the body 2 and has a chip removal rod 30, a chip removal thread portion 31 and a spiral chip removal groove 32. The chip removal rod 30 protrudes longitudinally from the bottom end of the screw rod 20. The chip removal rod 30 is thinner than the screw rod 20. The chip removal thread portion 31 is formed on an outer surface of the chip removal rod 30. The outer diameter of the chip removal thread portion 31 is close to the diameter of the screw rod 20. The spiral chip removal groove 32 is formed in the chip removal thread portion 31.

Figure 3:
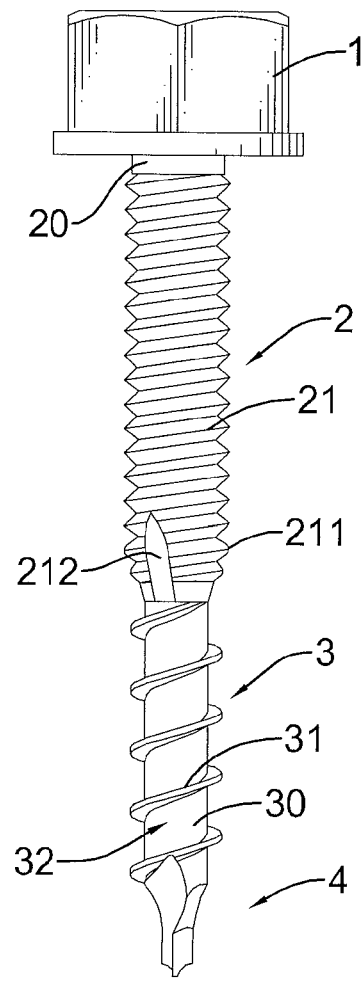
FIG. 3 is another side view of the self-drilling screw in FIG. 2.

With reference to FIGS. 1 to 3, the drilling blade 4 is flat with a tapered end and is formed on a bottom end of the chip removal section 3. The width of the drilling blade 4 is smaller than the outer diameter of the thread portion 21 and is slightly bigger than the diameter of the screw rod 20.

In a preferred embodiment as shown in FIG. 1, the chip removal thread portion 31 of the chip removal section 3 has multiple threads which surround the chip removal rod 30 less than one circle and extend from the drilling blade 4 to the body 2.

In a preferred embodiment as shown in FIGS. 2 and 3, the chip removal thread portion 31 of the chip removal section 3 has at least one thread which surrounds the chip removal rod 30 at least one circle and extends from the drilling blade 4 to the body 2.

With reference to FIGS. 1 to 3, the body 2 has a cone section formed adjacent to the chip removal section 3. The diameter of the cone section is gradually smaller towards the chip removal section 3. The cone section has multiple lengthwise furrows 212 formed on the outer surface of the cone section and multiple cone thread portions 211 formed on the outer surface of the cone section. Each cone thread portion 211 is formed between adjacent furrows 212.

Figure 4:
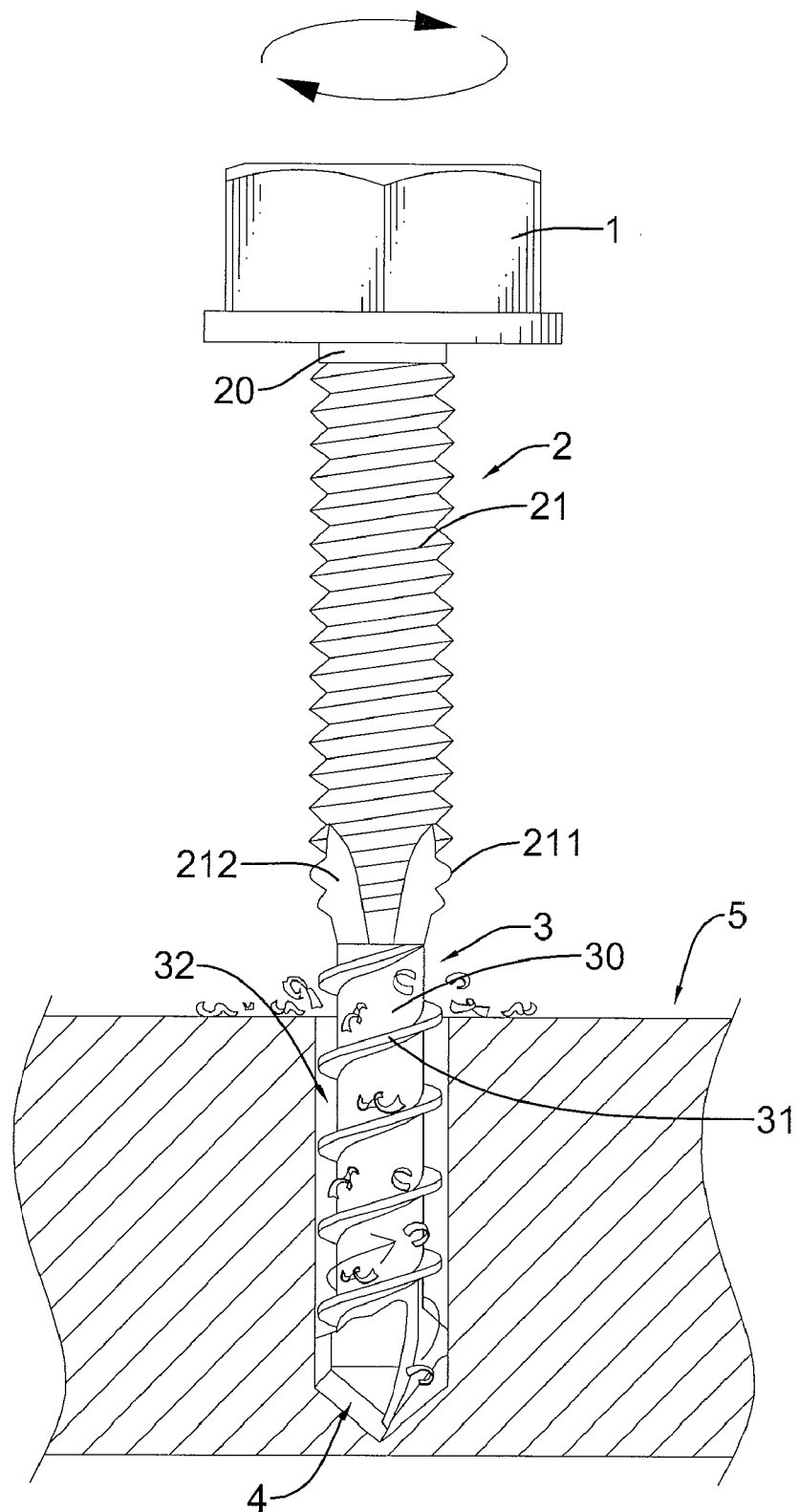
FIG. 4 is an operational view of the self-drilling screw in FIG. 2, shown the self-drilling screw drilled into a workpiece.

With reference to FIG. 4, while using the self-drilling screw as described, a user utilizes the tool to connect the screw head 1 of the self-drilling screw to allow the drilling blade 4 to drill into a workpiece 5. While the drilling blade 4 is drilled into the workpiece 5, the chips are removed along the chip removal groove 32 of the chip removal section 3. Then, the thread portion 21 of the body 2 is tapping a drilled hole of the workpiece 5 in order to screw into the workpiece 5. By the design of the cone thread portion 211, the body 2 gradually taps the drilled hole of the workpiece 5. Besides, by the design of the furrows 212, the cone thread portion 211 has better tapping ability and the tapping torque is reducing.

Figure 5C:
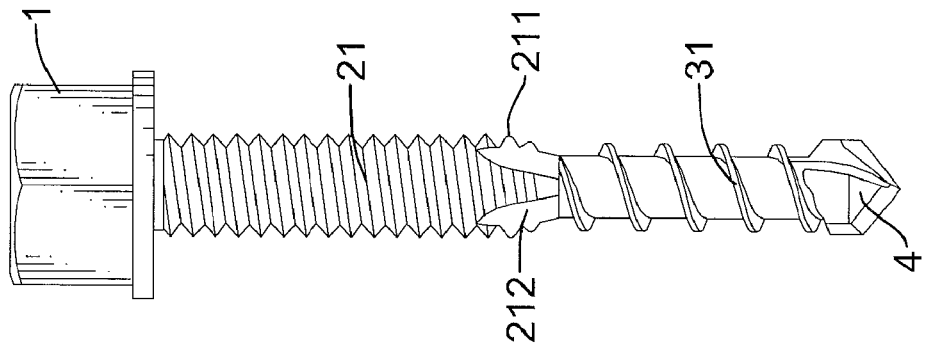
FIGS. 5A to 5C are sequential diagrams of a fabricating method for the self-drilling screw in FIG. 2.
Figure 5B:
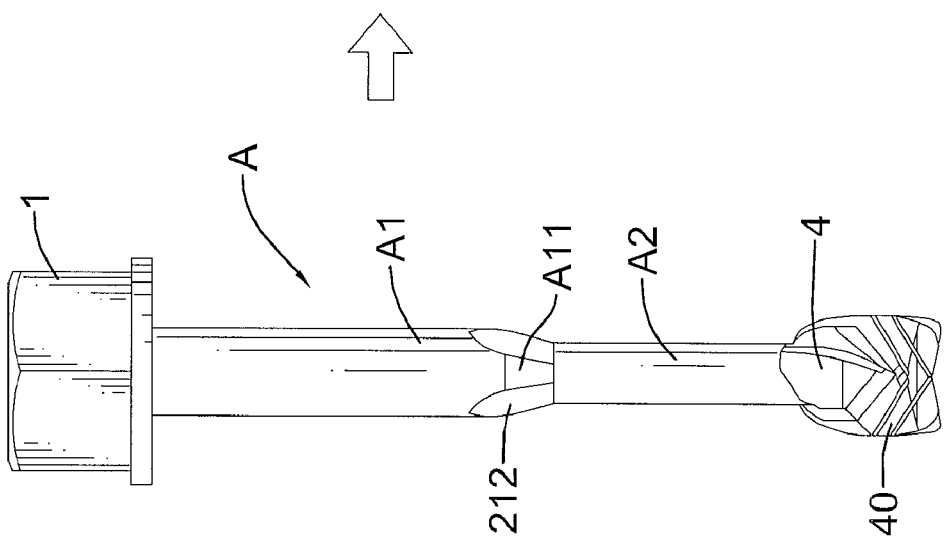
Figure 5A:
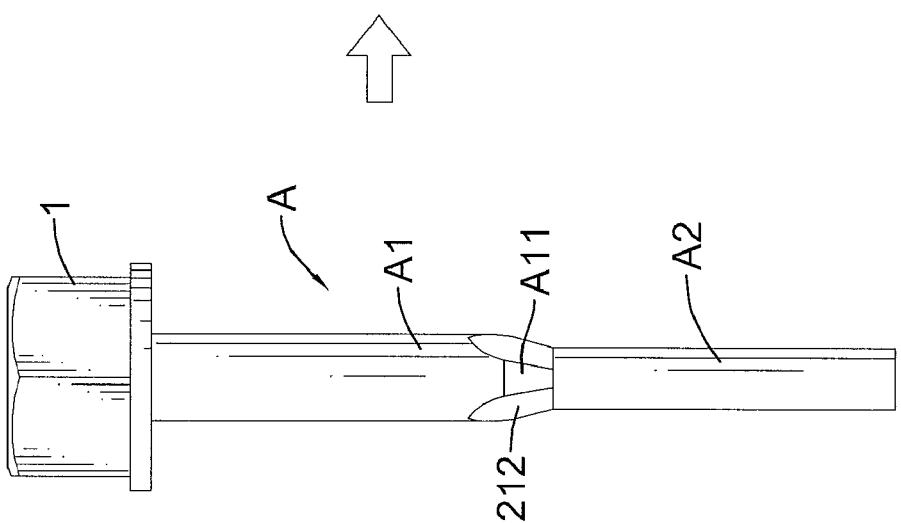
Figure 6:
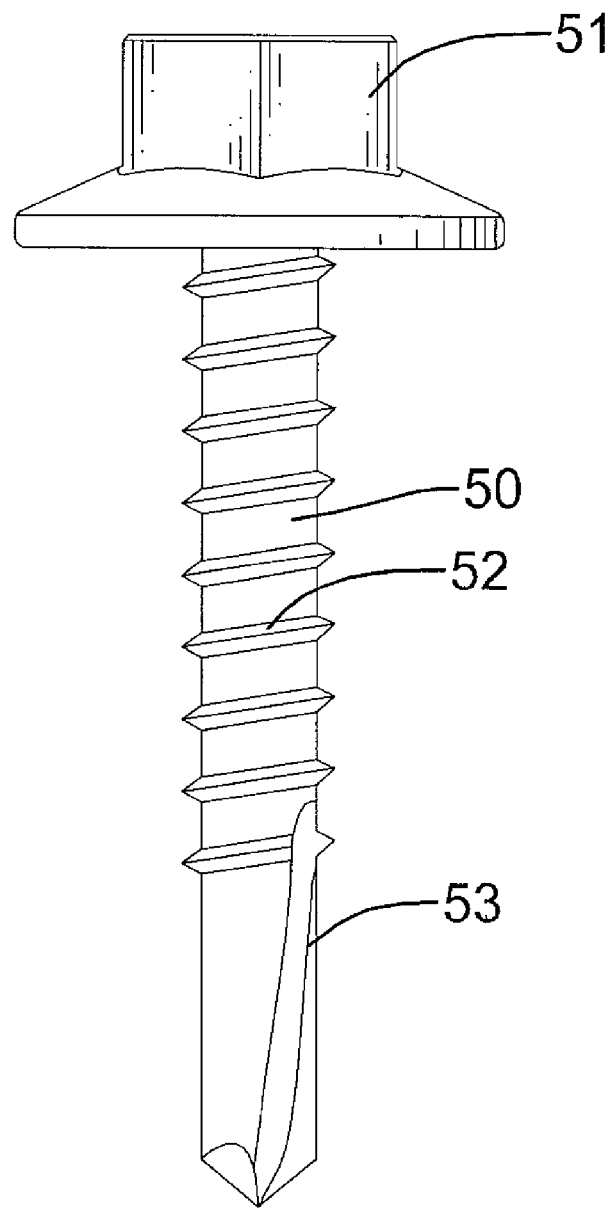
FIG. 6 is a side view of a conventional self-drilling screw.
Figure 7C:
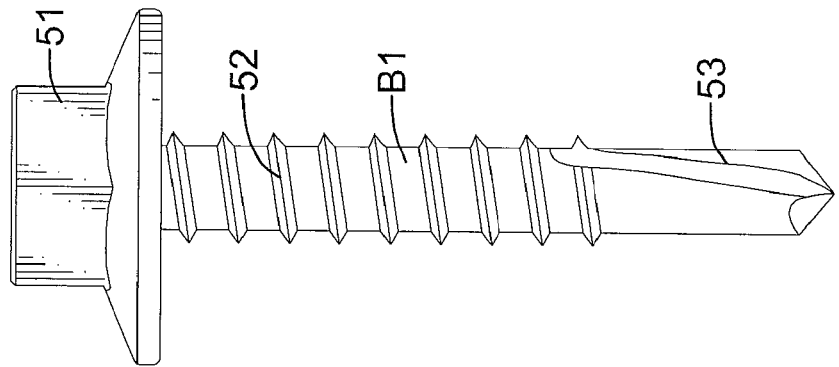
FIGS. 7A to 7C are sequential diagrams of a conventional fabricating method for the self-drilling screw in FIG. 6.
Figure 7B:
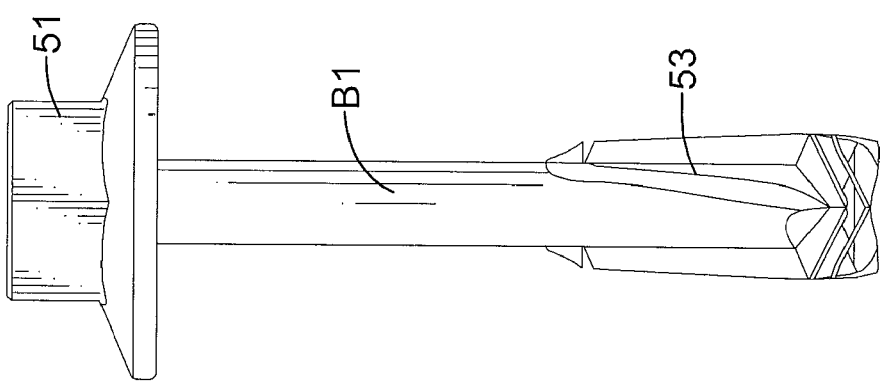
Figure 7A:
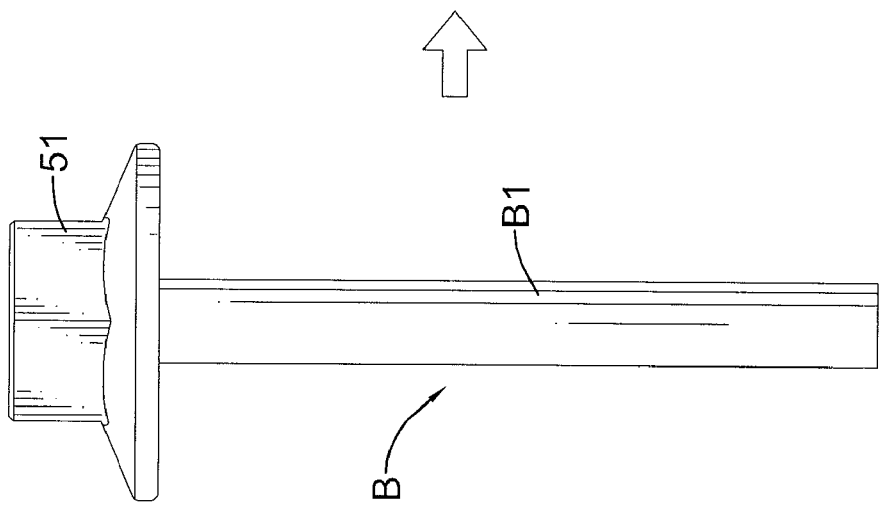

With reference to FIGS. 5A to 5C, a fabricating method for a self-drilling screw in accordance with the present invention comprising acts of:

As shown in FIG. 5A, forming a rod blank A with a main section A1, a secondary section A2 and a screw head 1 by punching, wherein the main section A1 is formed between the secondary section A2 and the screw head 1 and the secondary A2 is thinner than the main section A1;

As shown in FIG. 5B, forming a flat drilling blade 4 with a tapered end at a bottom end of the secondary section A2 by punching, wherein the width of the drilling blade 4 is slightly bigger than the diameter of the main section A1; and As shown in FIG. 5C, forming a thread portion 21 on an outer surface of the main section A1 and a chip removal thread portion 31 on an outer surface of the secondary section A2 by rolling.

In the act of forming the blank A with the main section A1, the secondary section A2 and the screw head 1 further forms a cone section on the main section A1 and adjacent to the secondary section A2 and forms multiple lengthwise furrows 212 on an outer surface of the cone section. The diameter of the cone section is gradually smaller towards the secondary section A2. Then in the act of forming the thread portion 21 and the chip removal thread portion 31 forms multiple cone thread portions 211 on the outer surface of the cone section at the same time. Each cone thread portion 211 is formed between adjacent furrows 212.

In the act of forming the drilling blade 4 forms burrs 40 near the drilling blade 4. Then in the act of forming the thread portion 21 and the chip removal thread portion 31 removes the burrs 40 at the same time.

The self-drilling screw in accordance with the present invention utilizes the flat drilling blade with the tapered end and the chip removal section having chip removal function to reduce the size of the drilling blade. Therefore, the self-drilling screw in accordance with the present invention reduces the size of the punching die, lowers the punching force, lowers both the load of the punching die and the load of the punching machine, improves the quality of the self-drilling screw, and lowers both the die cost and the manufacturing cost. Besides, the self-drilling screw in accordance with the present invention is especially suitable for fabricating the self-drilling screw of big size and made from material hard to manufacture like stainless steel.

Furthermore, because the chip removal groove is spiral, it is beneficial for the removal of chips while the self-drilling screw is drilled into the workpiece.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A self-drilling screw comprising:
   a screw head;
   a body formed on a bottom end of the screw head and having
      a screw rod protruding longitudinally from the bottom end of the screw head; and
      a thread portion formed on an outer surface of the screw rod;
   a chip removal section formed on a bottom end of the body and having
      a chip removal rod protruding longitudinally from the bottom end of the screw rod and being thinner than the screw rod;

a chip removal thread portion formed on an outer surface of the chip removal rod wherein the outer diameter of the chip removal thread portion is close to the diameter of the screw rod; and a spiral chip removal groove formed in the chip removal thread portion; and a drilling blade being flat with a tapered end and formed on a bottom end of the chip removal section wherein the width of the drilling blade is smaller than the outer diameter of the thread portion and is slightly bigger than the diameter of the screw rod, wherein the body has a cone section formed adjacent to the chip removal section wherein the diameter of the cone section is gradually smaller towards the chip removal section; and the cone section has multiple lengthwise furrows formed on the outer surface of the cone section and multiple cone thread portions formed on the outer surface of the cone section wherein each cone thread portion is formed between two furrows.

2. The self-drilling screw as claimed in claim 1, wherein the chip removal thread portion of the chip removal section has multiple threads which surround the chip removal rod less than one circle and extend from the drilling blade to the body.

3. The self-drilling screw as claimed in claim 1, wherein the chip removal thread portion of the chip removal section has at least one thread which surrounds the chip removal rod at least one circle and extends from the drilling blade to the body.

* * * * *